United States Patent
Ojima et al.

(10) Patent No.: US 10,625,421 B2
(45) Date of Patent: Apr. 21, 2020

(54) CONTROLLER, CONTROL SYSTEM, AND CONTROL METHOD

(71) Applicant: KABUSHIKI KAISHA YASKAWA DENKI, Kitakyushu-shi, Fukuoka (JP)

(72) Inventors: Masao Ojima, Fukuoka (JP); Kazuo Fujino, Fukuoka (JP)

(*) Notice: Subject to any disclaimer, the term of this patent is extended or adjusted under 35 U.S.C. 154(b) by 7 days.

(21) Appl. No.: 15/921,578

(22) Filed: Mar. 14, 2018

(65) Prior Publication Data

US 2018/0264649 A1  Sep. 20, 2018

(30) Foreign Application Priority Data

Mar. 16, 2017 (JP) ................................. 2017-051282

(51) Int. Cl.
  *B25J 9/16* (2006.01)
  *B25J 9/00* (2006.01)
  *G05B 19/418* (2006.01)

(52) U.S. Cl.
  CPC ........... *B25J 9/1669* (2013.01); *B25J 9/0096* (2013.01); *G05B 19/41815* (2013.01);
  (Continued)

(58) Field of Classification Search
  CPC ...... B25J 9/0096; B25J 9/1669; B25J 9/1682; G05B 19/41815; G05B 2219/2214; G05B 2219/39109; G05B 2219/39142; G05B 2219/39143; G05B 2219/39144; Y02P 90/08; Y10S 901/02; Y10S 901/15; Y10S 901/23
  See application file for complete search history.

(56) References Cited

U.S. PATENT DOCUMENTS 5,517,097 A   5/1996  Hayashida
8,965,574 B2  2/2015  Joly et al.
(Continued)

FOREIGN PATENT DOCUMENTS

DE   102015202017   8/2016
JP   H7-024765      1/1995
(Continued)

OTHER PUBLICATIONS

Extended Search Report in corresponding European Application No. 18161682.2, dated Aug. 27, 2018, 8 pages.
(Continued)

*Primary Examiner* — Yuhui R Pan
(74) *Attorney, Agent, or Firm* — Soei Patent & Law Firm (57) ABSTRACT

The control system includes a first controller, a second controller, and a third controller. The third controller includes a first communication module, a second communication module, and a control processing module configured to output a first operation command for operating the first controlled object to the first controller via the first communication module, configured to output a second operation command for operating the second controlled object to the second controller via the second communication module, configured to acquire information on a current position of the first controlled object from the first controller via the first communication module, and configured to correct the second operation command on a basis of information on the current position of the first controlled object.

18 Claims, 4 Drawing Sheets

(52) U.S. Cl.
CPC ..... *B25J 9/1682* (2013.01); *G05B 2219/2214* (2013.01); *G05B 2219/39109* (2013.01); *G05B 2219/39142* (2013.01); *G05B 2219/39143* (2013.01); *G05B 2219/39144* (2013.01); *Y02P 90/08* (2015.11); *Y10S 901/02* (2013.01); *Y10S 901/15* (2013.01); *Y10S 901/23* (2013.01)

(56) References Cited

U.S. PATENT DOCUMENTS

| | | | | |
|---|---|---|---|---|
| 2010/0008754 | A1* | 1/2010 | Hartmann | G05B 19/4103 414/800 |
| 2012/0197438 | A1* | 8/2012 | Ogami | B25J 9/1682 700/258 |
| 2015/0148952 | A1* | 5/2015 | Shiratsuchi | B25J 9/1682 700/248 |
| 2018/0021944 | A1 | 1/2018 | Schreiber | |

FOREIGN PATENT DOCUMENTS

| | | |
|---|---|---|
| JP | H7-072911 | 3/1995 |
| JP | 2003-285287 | 10/2003 |
| JP | 2005-161498 | 6/2005 |
| JP | 2006-000977 | 1/2006 |
| JP | 2010-274396 | 12/2010 |
| JP | 2013-526419 | 6/2013 |

OTHER PUBLICATIONS

Office Action issued in Japanese Patent Application No. P2017-051282, dated Nov. 19, 2019 (with English partial translation).
Office Action issued in Japanese Patent Application No. P2017-051282, dated Feb. 12, 2020 (with English partial translation).

* cited by examiner

CONTROLLER, CONTROL SYSTEM, AND CONTROL METHOD

CROSS-REFERENCE TO RELATED APPLICATION

This application is based upon and claims the benefit of priority from Japanese Patent Application No. 2017-051282, filed on Mar. 16, 2017, the entire contents of which are incorporated herein by reference.

BACKGROUND

1. Field

The present disclosure relates to a controller, a control system, and a control method.

2. Description of the Related Art

Japanese Unexamined Patent Publication No. H07-72911 discloses a control method in which it is determined whether the operation mode of the first axis is a normal operation mode or a position synchronous operation mode in which the position synchronization between the first axis and the other axis is established, and when it is determined that the operation mode is the position synchronous operation mode, a transfer function model of the first axis and the other axis is inserted with respect to the position command output to the other axis.

SUMMARY

A control system according to an example embodiment of the present disclosure includes a first controller configured to control a first controlled object, a second controller configured to control a second controlled object having higher responsiveness than the first controlled object, and a third controller configured to operate the first controlled object via the first controller and configured to operate the second controlled object via the second controller. The third controller includes a first communication module configured to input and output information to and from the first controller, a second communication module configured to input and output information to and from the second controller, and a control processing module configured to output a first operation command for operating the first controlled object to the first controller via the first communication module, configured to output a second operation command for operating the second controlled object to the second controller via the second communication module, configured to acquire information on a current position of the first controlled object from the first controller via the first communication module, and configured to correct the second operation command based on information on the current position of the first controlled object.

A controller according to an example embodiment of the present disclosure includes a first communication module configured to input and output information to and from a first controller configured to control a first controlled object, a second communication module configured to input and output information to and from a second controller configured to control a second controlled object having higher responsiveness than the first controlled object, and a control processing module configured to output a first operation command for operating the first controlled object to the first controller via the first communication module, configured to output a second operation command for operating the second controlled object to the second controller via the second communication module, configured to acquire information on a current position of the first controlled object from the first controller via the first communication module, and configured to correct the second operation command based on information on the current position of the first controlled object.

A controller according to an example embodiment of the present disclosure includes a power output module configured to output driving power in accordance with a first operation command to a first controlled object, a communication module configured to input and output information to and from another controller, and a control processing module configured to derive predicted position information on the first controlled object based on a current position of the first controlled object, a model of the first controlled object, and the first operation command, and configured to output the predicted position information to the other controller via the communication module.

A control method according to an example embodiment of the present disclosure is performed by a third controller configured to operate a first controlled object via a first controller that controls the first controlled object, and configured to operate a second controlled object via a second controller that controls the second controlled object having higher responsiveness than the first controlled object, and the control method includes outputting a first operation command for operating the first controlled object to the first controller, outputting a second operation command for operating the second controlled object to the second controller, acquiring information on a current position of the first controlled object from the first controller, and correcting the second operation command based on information on the current position of the first controlled object.

DETAILED DESCRIPTION

Hereinafter, embodiments will be described in detail with reference to the drawings. Note that in the description, elements having the same element or the same function are denoted by the same reference numerals, and duplicate explanation is omitted.

[Control System]

Figure 1:
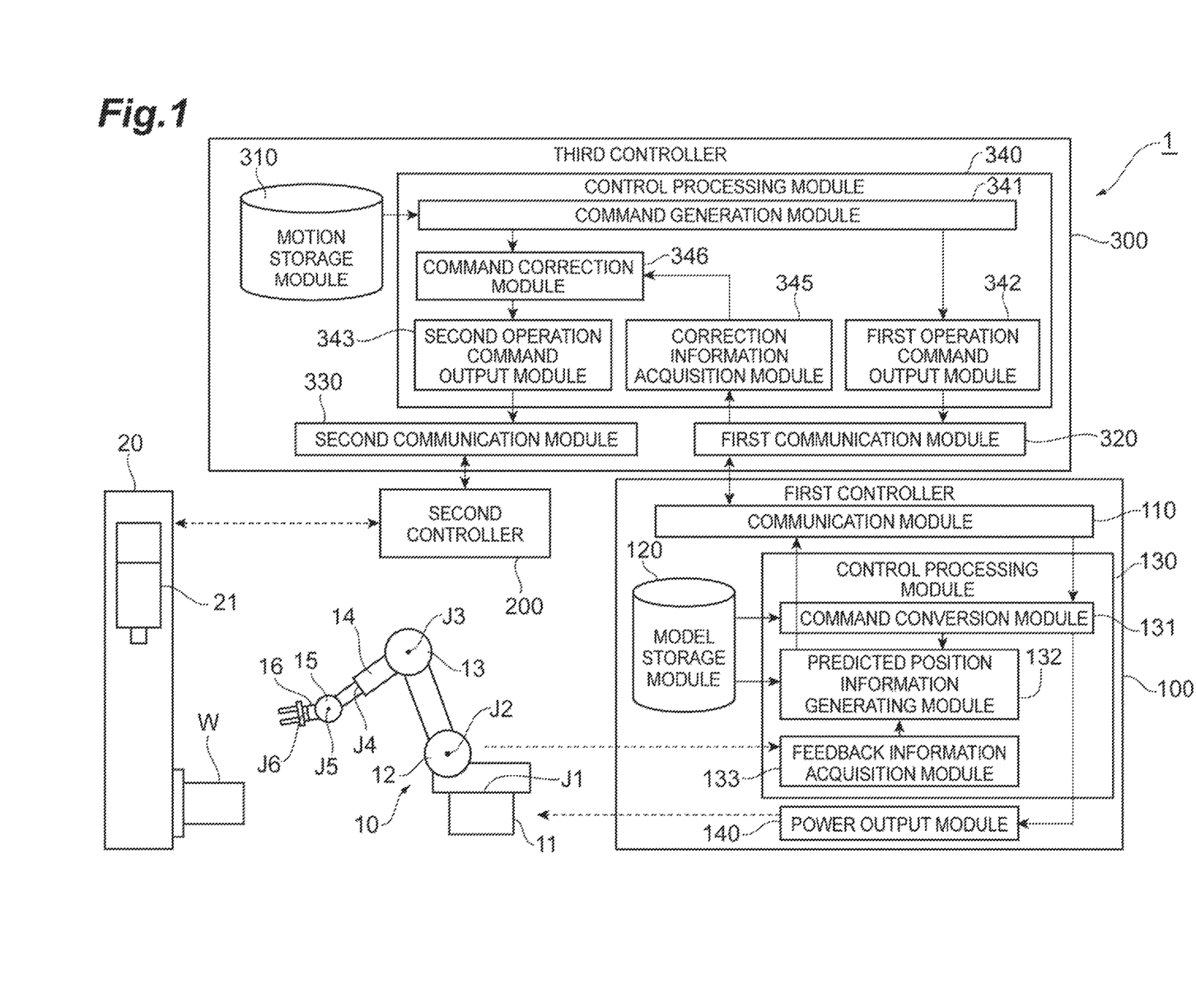
FIG. 1 is a block diagram showing a functional configuration of a control system, according to one or more embodiments.

The control system 1 according to one or more embodiments controls plural types of controlled objects having different timing characteristics, such as responsiveness for example, while synchronizing them as necessary, in order for the second controlled object to perform a collaborative operation with the first controlled object. As shown in FIG. 1, the plurality of controlled objects include a first controlled object associated with a first timing characteristic and a second controlled object associated with a second timing characteristic. For example, the second controlled object may have a higher responsiveness than the first controlled object In one or more embodiments, the first controlled object and the second controlled object may be of any type as long as the condition that the responsiveness of the second controlled object is higher than the responsiveness of the first controlled object is satisfied. Responsiveness means the speed at which a target value is achieved upon the controlled object receiving a command. That is to say, the first controlled object has a first response speed (as a first timing characteristic) and the second controlled object has a second response speed (as a second timing characteristic) that is higher, i.e. faster, than the first response speed. For example, the first controlled object is a multi-axis robot 10, and the second controlled object is a peripheral device 20 that is cooperatively operable with the multi-axis robot, by holding and moving a workpiece W that is a job target of the multi-axis robot 10.

The multi-axis robot 10 is, for example, a vertically articulated robot having serially linked joints, and includes a plurality (for example, six axes) of joint axes J1 to J6 and a plurality of actuators 11 to 16 for driving the respective joint axes J1 to J6.

The peripheral device 20 includes an actuator, for example, a servomotor 21, and operates by using the servomotor 21 as a power source. Although only one servomotor 21 is depicted in FIG. 1, the peripheral device 20 may include a plurality of servomotors 21. For example, the peripheral device 20 may include a turntable for holding the workpiece W and a linear motion shaft for moving the turntable, and may include two servomotors 21 for each driving the turntable and the linear motion shaft. In other words, the peripheral device 20 may have one or more motion axes that are associated with the servomotors 21. The number of the motion axes may be smaller than the number of the joint axes J1 to J6 of the multi-axis robot 10.

For example, the control system 1 controls the peripheral device 20 so as to hold the workpiece W on the turntable at a predetermined delivery location away from the multi-axis robot 10. Next, a first controller 100 controls the peripheral device 20 so as to drive the linear motion shaft to move the turntable to the working range of the multi-axis robot 10, and controls the multi-axis robot 10 so that the multi-axis robot 10 performs a job of handling the workpiece W. Examples of the job of handling the workpiece W performed by the multi-axis robot 10 include arc welding, assembly, and the like. At this time, the control system 1 controls the peripheral device 20 so as to drive at least one of the turntable and the linear motion shaft in cooperation with the job performed by the multi-axis robot 10 to adjust the position and attitude of the workpiece. When the job performed by the multi-axis robot 10 is completed, the control system 1 controls the peripheral device 20 so as to drive the linear motion shaft again to return the turntable to the delivery place, and so as to hold another workpiece for which the job is newly performed on the turntable instead of the workpiece W for which the job has been completed. Thereafter, the control system 1 repeats the above-described series of control.

Here, in general, responsiveness of the controlled object can be made higher if the controlled object has smaller inertia and higher rigidity. In the example of the present embodiment, the operation of the peripheral device 20 is simpler than that of the multi-axis robot 10, and the peripheral device 20 can employ a structure with small inertia and high rigidity, thereby having higher responsiveness than that of the multi-axis robot 10. For this reason, if the multi-axis robot 10 and the peripheral device 20 are controlled with the responsiveness delay ignored, the operation timings of the multi-axis robot 10 and the peripheral device 20 are shifted.

Therefore, the control system 1 switches a mode between the normal control mode and the synchronous control mode. The synchronous control mode is a control mode for reducing the shift (or timing offset) of the operation timings between the multi-axis robot 10 and the peripheral device 20 as compared with the normal control mode. For example, the control system 1 sets the control mode to the synchronous control mode when controlling the peripheral device 20 so as to adjust the position and attitude of the workpiece in cooperation with the job performed by the multi-axis robot 10, and sets the synchronous control mode to the normal control mode when controlling the peripheral device 20 so as to move the workpiece W to and from the working range of the multi-axis robot 10. The shift of operation timings (or timing offset) may be caused for example, by differences in timing characteristics, such as data processing speeds for controlling the first and second controlled objects, and/or responsiveness of the first and second controlled objects. For example, responsiveness may be due to mechanical properties, such as the number of motors or the speed of motors operating the first or second controlled objects, the range of motion of components of the first or second controlled objects, etc. Alternatively, responsiveness may be due to processing speed of the first or second controlled objects. For example, the first controlled object may require a first response delay between receiving a command and carrying out an operation in response to the command, while the second controlled object may require a second response delay between receiving a command and carrying out an operation in response to the command. In addition, a processing time for the processing device to generate the first operation command and for the processing device to generate the second operation command may differ. Thus, a timing offset may occur when the first and second response delays are different.

Hereinafter, a specific configuration of the control system 1 will be described. The control system 1 includes the first controller 100 configured to control a first controlled object, a second controller 200 configured to control a second controlled object, and a third controller 300 configured to operate the first controlled object via the first controller 100 and configured to operate the second controlled object via the second controller 200.

The third controller 300 is, for example, a machine controller, and outputs an operation command (for example, a control signal including a target value to reach, i.e. a value representing a target position, attitude and/or the like) to the first controller 100 and the second controller 200 at a predetermined control cycle.

The third controller 300 includes a motion storage module 310, a first communication module 320, a second communication module 330, and a control processing module 340 as a functional configuration (hereinafter referred to as "functional module").

The motion storage module 310 stores information defining the operation content of the multi-axis robot 10 and the peripheral device 20 (hereinafter referred to as "motion information"). The motion information includes, for example, a list in which operation commands to be output to the multi-axis robot 10 and the peripheral device 20 are arranged in time series and a flag specifying a control mode (the nominal control mode or the synchronous control mode). That is to say, the motion information indicates a sequential operation of the first and second controllers, for example a sequential list of operation commands for the first and second controllers in association with timing information.

Figure 2:
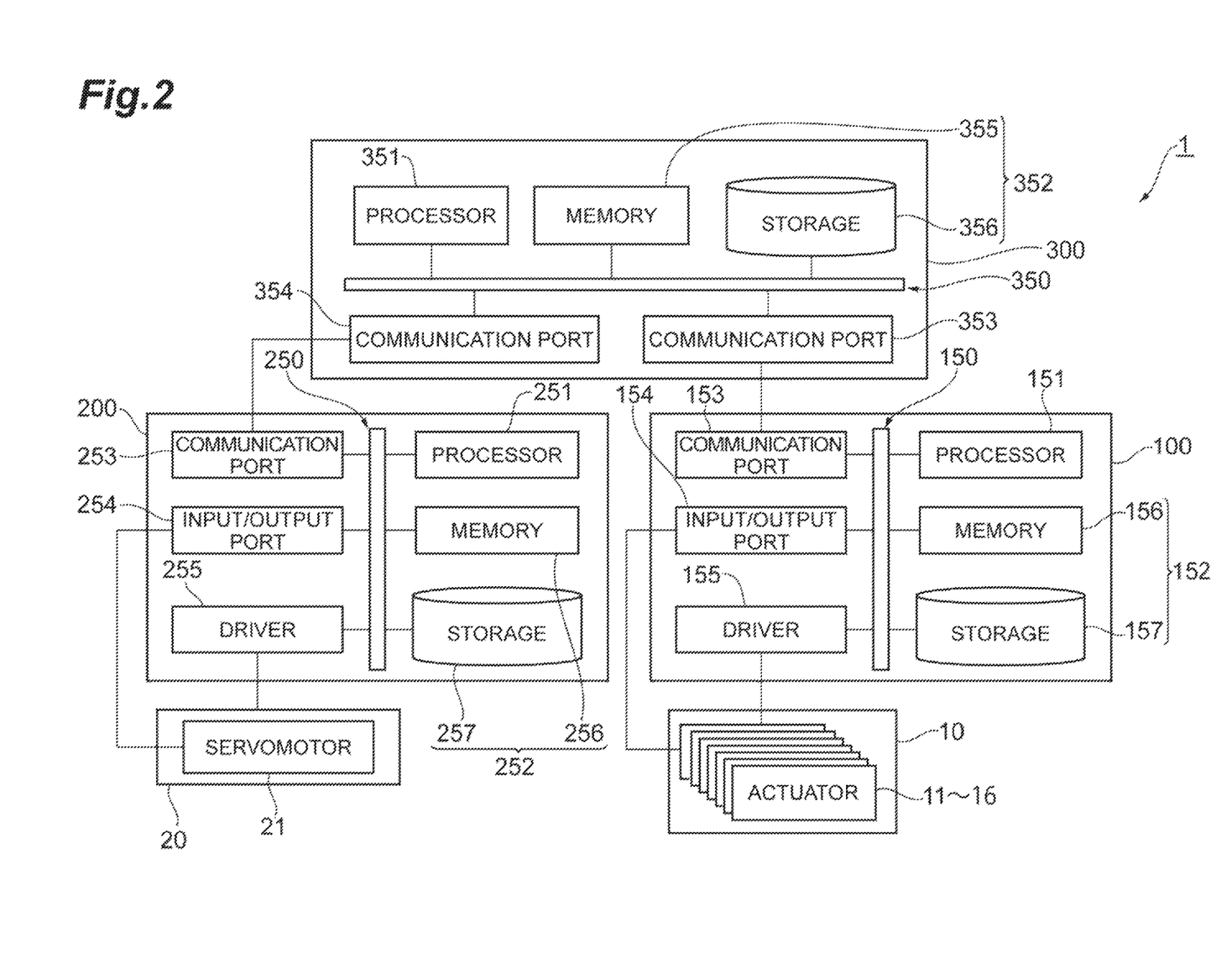
FIG. 2 is a block diagram showing a hardware configuration of an example control system.

The first communication module 320 inputs and outputs information to and from the first controller 100. The first communication module 320 may comprise a first communication device, for example a communication port 353 (FIG. 2). The second communication module 330 inputs and outputs information to and from the second controller 200. The second communication module 320 may comprise a second communication device, for example a communication port 354 (FIG. 2).

The control processing module 340 is configured to repeat a number of control cycles, each comprising outputting a first operation command for operating the multi-axis robot 10 to the first controller 100 via the first communication module 320, outputting a second operation command for operating the peripheral device 20 to the second controller 200 via the second communication module 330, acquiring information on the current position of the multi-axis robot 10 from the first controller 100 via the first communication module 320, and correcting (or modifying) the second operation command based on information on the current position of the multi-axis robot 10 and based on the difference between the first timing characteristic and the second timing characteristic, in order to calibrate an operation of the peripheral device 20, in accordance with the position and movement of the multi-axis robot 10, for example in some cases in order to synchronize or calibrate the collaborative operation of the peripheral device 20 with the operation of the multi-axis robot 10.

For example, the control processing module 340 includes a command generation module 341, a first operation command output module 342, a second operation command output module 343, a correction information acquisition module 345, and a command correction module 346 as further divided functional modules. The control processing module 340 may comprise a processing device, for example, a processor 351 (FIG. 2).

The command generation module 341 generates the first operation command and the second operation command for each control cycle based on the motion information stored in the motion storage module 310. The motion storage module may be associated with a storage device, for example the memory 355 and/or storage device 356 (FIG. 2). The first operation command includes, for example, numeric data that defines a positional target value (e.g. target position, target attitude and/or the like) of the first controlled object. In this example, the positional target value sets a position/attitude target value of the tip portion of the multi-axis robot 10. The second operation command is, for example, numeric data that defines a positional target value (e.g. target position, target angle and/or the like) of the second controlled object. In this example, the positional target value sets an angle target value of the servomotor 21 of the peripheral device 20. In one or more embodiments, the motion information is in a table format (or database) and comprises timing values sequenced in chronological order, and a first value and second value associated with each of the timing values. In addition, a control mode (the normal control mode or the synchronous control mode) is associated with each of the timing values. The first values may be values to be output as the first operation command and the second values may be values to be output as the second operation command. By following the information stored in the table, the first operation command and the second operation command may be output depending on the timing values. The first values and the second values may comprise positional information (such as a position, an angle, an attitude, etc.). Accordingly, the first or second operation command signals the first or second controlled object to achieve the positioning (e.g. position, angle, attitude, etc.) specified in the positional information. In some cases, a timing offset may occur as mentioned above, for example, when the first value output as the first operation command and the second value output as the second operation command are associated with different timing values in the table of the motion information. When such a timing offset occurs, in the synchronous control mode for example, the second operation command may be corrected so that the first and second operations commands are correlated with the same timing value in the table. For example, a first value may be selected among the first values in the table (as a selected first value) based on the information on the current position of the first controlled object, and the second operation command may then be corrected to correspond to the second value that is correlated with the selected first value in the table of the motion information.

The first operation command output module 342 outputs the first operation command to the first controller 100 via the first communication module 320.

The correction information acquisition module 345 acquires information on the current position of the multi-axis robot 10 from the first controller 100 via the first communication module 320. Note that the current position means a position at the time when sensing of information for specifying the current position (for example, the current angle of the joint axes J1 to J6) is executed. Information on the current position of the multi-axis robot 10 is predicted position information of the multi-axis robot 10 that is derived based on the current position of the multi-axis robot 10, model information (described later) on the multi-axis robot 10, and the first operation command (for example, predicted position information at the time of shifting to the next control cycle). The information on the current position of the multi-axis robot 10 may be information indicating the current position itself of the multi-axis robot 10 (for example a position, attitude and/or the like of the multi-axis robot 10 or a component thereof). In some embodiment, the information on the current position or the predicted position information (also referred to herein as "predicted positioning") refers to data on the position (e.g., spatial position), the attitude (e.g., angular position with respect to one or more axes), and/or the like of the first controlled object, for example, the position and attitude of a particular component of the first controlled object.

The command correction module 346 corrects the second operation command generated by the command generation module 341 based on the information acquired by the correction information acquisition module 345. For example, the command correction module 346 corrects the second operation command so as to reduce the shift of the operation timings between the operation of the multi-axis robot 10 and the operation of the peripheral device 20.

The second operation command output module 343 outputs the second operation command corrected by the command correction module 346 to the second controller 200 via the second communication module 330.

The first controller 100 is, for example, a robot controller, and controls the actuators 11 to 16 so as to operate the multi-axis robot 10 in accordance with the first operation command output from the third controller 300. The first controller 100 includes, as functional modules, a communication module 110, a model storage module 120, and a control processing module 130.

The communication module 110 inputs and outputs information to and from the third controller 300.

The model storage module 120 stores model information of the multi-axis robot 10. The model information includes numerical data indicating the mechanical parameters and control parameters of the multi-axis robot 10, such as the structure, size, mass, etc. of the multi-axis robot 10, and the rated output and the control gain of the actuators 11 to 16.

The control processing module 130 is configured to derive the predicted position information based on the current position of the multi-axis robot 10, the model information of the multi-axis robot 10, and the first operation command, and is configured to output the predicted position information to the third controller 300 via the communication module 110.

For example, the control processing module 130 includes a command conversion module 131, a predicted position information generation module 132, and a feedback information acquisition module 133 as further divided functional modules.

The command conversion module 131 acquires the first operation command from the third controller 300 via the communication module 110 and converts the first operation command into the angle target value of the joint axes J1 to J6. For example, the command conversion module 131 performs an inverse kinematics calculation using the position and attitude target value of the tip portion of the multi-axis robot 10 acquired via the communication module 110 and the model information stored in the model storage module 120, thereby generating angle target values of the joint axes J1 to J6.

The feedback information acquisition module 133 acquires information for specifying the current position of the multi-axis robot 10 from the multi-axis robot 10. For example, the feedback information acquisition module 133 acquires information indicating the angles of the joint axes J1 to J6 from the actuators 11 to 16.

The predicted position information generation module 132 derives the predicted position information based on the current position of the multi-axis robot 10, the model information of the multi-axis robot 10, and the first operation command, and outputs the predicted position information to the third controller 300 via the communication module 110. For example, the predicted position information generation module 132 performs kinematics calculation and dynamics calculation using the angle target values of the joint axes J1 to J6 generated by the command conversion module 131, the angle information of the joint axes J1 to J6 acquired by the feedback information acquisition module 133, and the model information stored in the model storage module 120, thereby generating the predicted position information (for example, numerical data indicating a predicted position and attitude of the tip portion of the multi-axis robot 10) at the time of transition to the next control cycle to output the information to the third controller 300 via the communication module 110. Thus, the predicted positioning (or predicted position information) is predicted taking into account a delay. In some examples, the delay may be based on a time delay between acquiring of the information on the current position of the first controlled object and operating of the second controlled object in response to the second operation command. In some embodiments, the predicted position information is associated with a positioning that the first controlled object is predicted to have at a time of transition to a next one of the control cycles. In some examples, the positioning may include data on position, attitude and/or the like of a particular component of the first controlled object.

Note that in some embodiments, the predicted position information generation module 132 may derive the predicted position information based on the current position information of the multi-axis robot 10 (the angle of the joint axes J1 to J6 acquired by the feedback information acquisition module 133) in all control cycles of the synchronous control mode. In other embodiments, the predicted position information may correspond to the current position information of the multi-axis robot 10 in some control cycles, and to the predicted position information in the previous control cycle (instead of the current position information of the multi-axis robot 10) in other control cycles. For example, in the control cycle immediately after the start of the synchronous control mode, the predicted position information may be derived using the current position information of the multi-axis robot 10, and thereafter, in the control cycle until the synchronous control mode is switched to the normal control mode, the predicted position information in the previous control cycle may be used instead of the current position information of the multi-axis robot 10.

A power output module 140 outputs driving power in accordance with the first operation command to the multi axis robot 10. For example, the power output module 140 outputs the driving power for operating the joint axes J1 to J6 to the actuators 11 to 16 according to the angle target value generated by the command conversion module 131.

The second controller 200 is, for example, a servo controller, and controls the servomotor 21 so as to operate the peripheral device 20 in accordance with the second operation command output from the third controller 300.

FIG. 2 is a block diagram showing an example of a hardware configuration of a control system 1. As shown in FIG. 2, the third controller 300 includes a circuit 350. The circuit 350 includes one or more processors 351, a storage module 352, and communication ports 353 and 354.

The storage module 352 includes a memory 355 and a storage 356. The storage 356 functions as the motion storage module 310 and records a program used to configure each functional module of the control processing module 340. The storage 356 may be any unit as long as it is computer readable. Specific examples of the storage 356 include a hard disk, a nonvolatile semiconductor memory, a magnetic disk, an optical disk, and the like. The memory 355 temporarily stores the program loaded from the storage 356, the calculation result by a processor 351, and the like. The processor 351 executes programs in cooperation with the memory 355, thereby constituting each functional module of the control processing module 340. That is, the processor 351 functions as the control processing module 340.

The communication port 353 performs information communication (for example, high-speed serial communication) with a communication port 153 (described later) of the first controller 100 in accordance with a command from the processor 351. The communication port 353 functions as the first communication module 320. The communication port 354 performs information communication (for example, high-speed serial communication) with the communication port 253 (described later) of the second controller 200 in accordance with a command from the processor 351. The communication port 354 functions as the second communication module 330.

The first controller 100 includes a circuit 150. The circuit 150 includes one or more processors 151, a storage module 152, the communication port 153, an input/output port 154, and a driver 155.

The storage module 152 includes a memory 156 and a storage 157. The storage 157 functions as the model storage module 120 and records a program used to configure each functional module of the control processing module 130. The storage 157 may be any unit as long as it is computer readable. Specific examples of the storage 156 include a hard disk, a nonvolatile semiconductor memory, a magnetic disk, an optical disk, and the like. The memory 156 temporarily stores the program loaded from the storage 157, the calculation result by a processor 151, and the like. The processor 151 executes programs in cooperation with the memory 156, thereby constituting each functional module of the control processing module 130. That is, the processor 151 functions as the control processing module 130.

The communication port 153 performs information communication with the communication port 353 of the third controller 300 in accordance with a command from the processor 151. The communication port 153 functions as the communication module 110. The input/output port 154 acquires electric signals indicating the angles of the joint axes J1 to J6 from the actuators 11 to 16 in accordance with a command from the processor 151. The driver 155 outputs driving power to the actuators 11 to 16 in accordance with a command from the processor 151. The driver 155 functions as the power output module 140.

The second controller 200 includes a circuit 250. The circuit 250 includes one or more processors 251, a storage module 252, a communication port 253, an input/output port 254, and a driver 255.

The storage module 252 includes a memory 256 and a storage 257. The storage 257 records a program for controlling the peripheral device 20. The storage 257 may be any unit as long as it is computer readable. Specific examples of the storage 257 include a hard disk, a nonvolatile semiconductor memory, a magnetic disk, an optical disk, and the like. The memory 256 temporarily stores the program loaded from the storage 257, the calculation result by the processor 251, and the like. The processor 251 executes a program in cooperation with the memory 256 to execute control of the peripheral device 20 in accordance with the second operation command.

The communication port 253 performs information communication with the communication port 354 of the third controller 300 in accordance with a command from the processor 251. The input/output port 254 acquires an electric signal indicating the rotation angle of the servomotor 21 in accordance with a command from the processor 251. The driver 255 outputs driving power to the servomotor 21 in accordance with a command from the processor 251.

The hardware configuration of the controllers 100, 200, 300 is not necessarily limited to the configuration that constitutes each functional block by a program. For example, at least part of the functional modules of the controllers 100, 200, 300 may be constituted by a dedicated logic circuit or an ASIC (Application Specific Integrated Circuit) in which the dedicated logic circuits are integrated.

[Control Method]

Next, as an example of the control method, the control processing procedure in the third controller and the control processing procedure in the first controller will be described.

(Control Processing Procedure in Third Controller)

Figure 3:
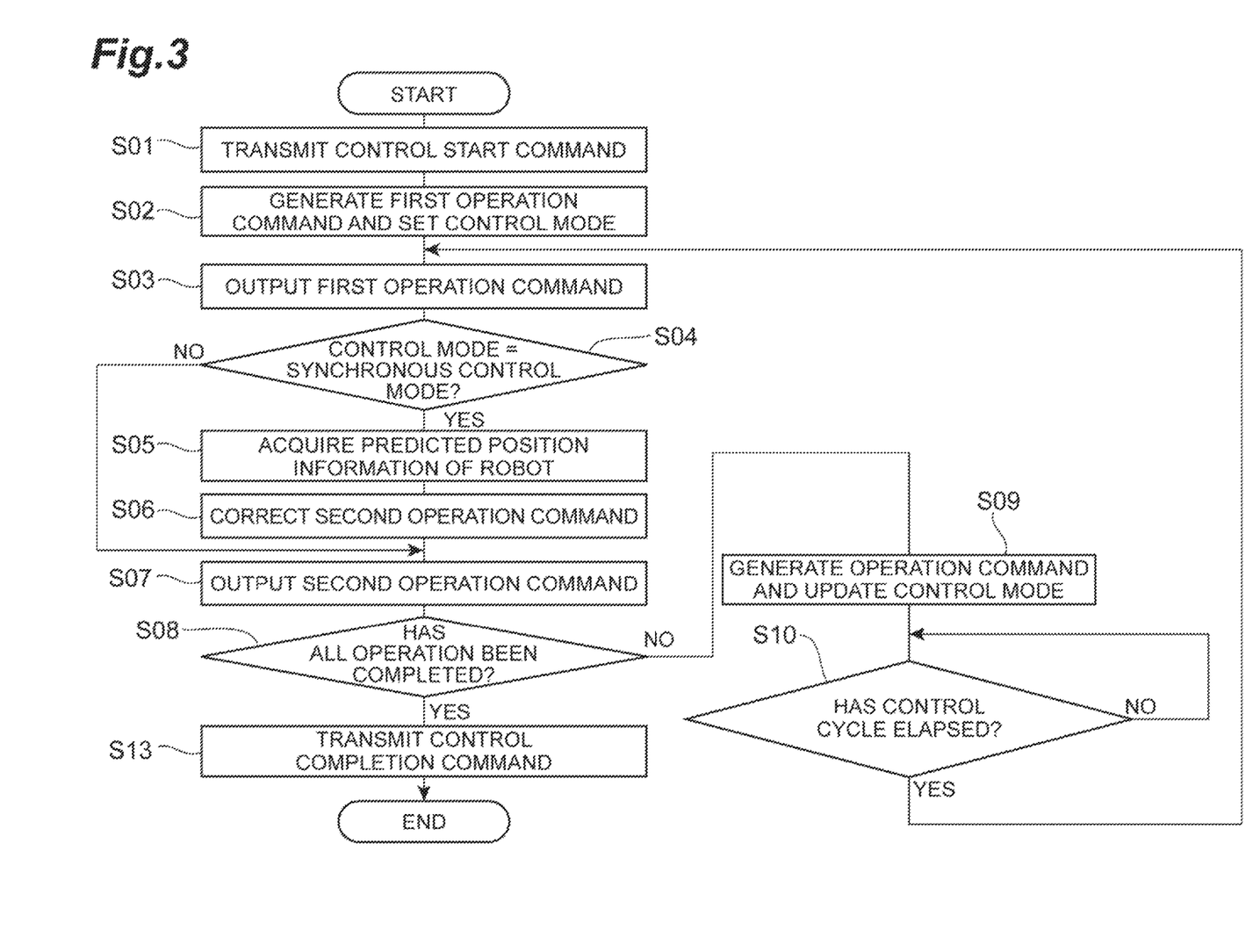
FIG. 3 is a flowchart showing an example control procedure of a third controller.

In some example embodiments, the third controller 300 may be configured to sequentially execute some or all of the steps illustrated in FIG. 3 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S01, the command generation module 341 outputs a start command of the control of the multi-axis robot 10 to the first controller 100 via the first operation command output module 342 and the first communication module 320, and outputs a start command of the control of the peripheral device 20 to the second controller 200 via the second operation command output module 343 and the second communication module 330.

In step S02, the command generation module 341 generates a first operation command and a second operation command after the start of the control and sets the control mode based on the motion information stored in the motion storage module 310.

In step S03, the first operation command output module 342 outputs the first operation command generated by the command generation module 341 to the first controller 100 via the first communication module 320.

In step S04, the current control mode is checked.

In response to determining in step S04 that the current control mode is the synchronous control mode, the process proceeds to step S05, and the correction information acquisition module 345 acquires information on the current position of the multi-axis robot 10 from the first controller 100 via the first communication module 320. For example, the correction information acquisition module 345 acquires the predicted position information (for example, numerical data indicating the predicted position and attitude of the tip portion of the multi-axis robot 10 at the point of transition to the next control cycle) from the first controller 100 as information on the current position of the multi-axis robot 10.

In step S06, the command correction module 346 corrects the second operation command generated by the command generation module 341 based on the predicted position information acquired by the correction information acquisition module 345. For example, the command correction module 346 corrects the second operation command so as to reduce the shift of the operation timings between the operation of the multi-axis robot 10 and the operation of the peripheral device 20. More specifically, the command correction module 346 corrects the second operation command so that the workpiece is disposed at a position corresponding to the predicted position and attitude of the tip portion of the multi-axis robot 10. That is to say, the second operation command may be modified in order to position the second controlled object based on the predicted positioning of the first controlled object. The position corresponding to the predicted position and attitude is, for example, a position suitable for a job in which the multi-axis robot 10 places the tip portion in the predicted position and attitude. The command correction module 346 may refer to the motion information stored in the motion storage module 310 and specify the second operation command that was scheduled to be output at the same timing as the first operation command that matches the predicted position and attitude, thereby setting this second operation command as the second operation command after the correction. "Match" here includes a state in which a difference between the predicted position/attitude and the actual position/attitude of the tip portion of the multi-axis robot 10 remains within a suitable a tolerance level (negligible level).

In step S07, the second operation command output module 343 outputs the second operation command corrected by the command correction module 346 to the second controller 200 via the second communication module 330.

In response to determining in step S04 that the current control mode is the normal control mode, the process proceeds to step S07 without executing steps S05 and S06. Therefore, in the normal control mode, the second operation command is output to the second controller 200 without going through the correction processing for synchronization.

In step S08, the command generation module 341 checks whether the output of all the operation commands defined by the motion information has been completed.

In response to determining in step S08 that the operation command to be output remains, the process proceeds to step S09, the command generation module 341 generates a first operation command and a second operation command for the next control cycle and sets the control mode based on the motion information stored in the motion storage module 310.

In step S10, the command generation module 341 waits for the control cycle to elapse. Thereafter, the third controller 300 returns the process to step S03. Thereafter, the output of the first operation command, the correction of the second operation command, the output of the second operation command, and the update of the operation command are repeated in the control cycle until the output of all operation commands is completed.

In response to determining in step S08 that the output of all operation commands has been completed, the process proceeds to step S13, and the command generation module 341 outputs a completion command of the control of the multi-axis robot 10 to the first controller 100 via the first operation command output module 342 and the first communication module 320, and outputs a completion command of the control of the peripheral device 20 to the second controller 200 via the second operation command output module 343 and the second communication module 330. The control processing procedure in the third controller 300 is thus completed.

(Control Processing Procedure in First Controller)

Figure 4:
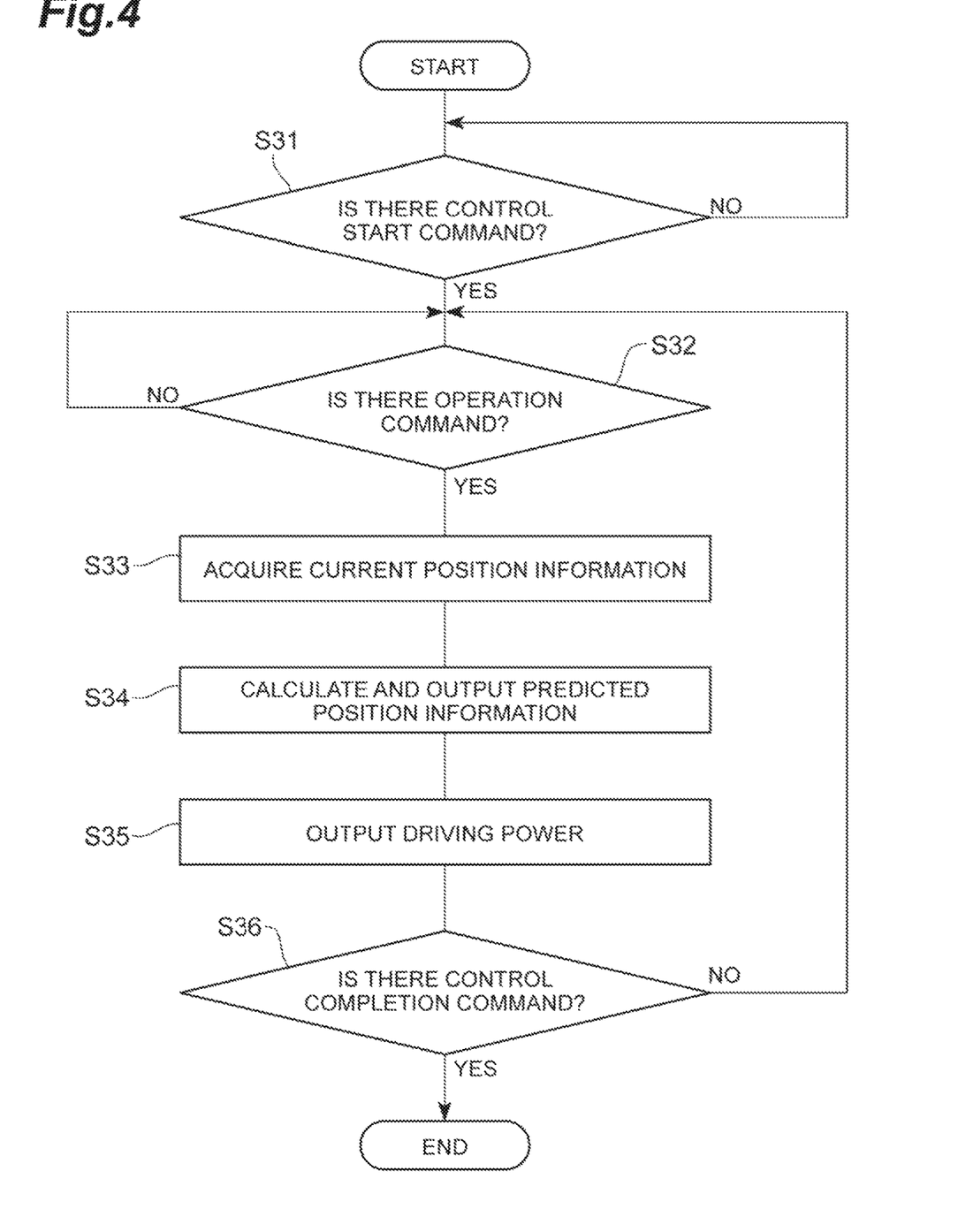
FIG. 4 is a flowchart showing an example control procedure of a first controller.

In some example embodiments, the first controller 100 may be configured to sequentially execute some or all of the steps illustrated in FIG. 4 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S31, the command conversion module 131 checks the reception status of the command from the first communication module 320 to the communication module 110, and waits for a start command of control of the multi-axis robot 10.

In step S32, the command conversion module 131 checks the reception status of the command from the first communication module 320 to the communication module 110, and waits for the reception of the first operation command.

In step S33, the feedback information acquisition module 133 acquires information indicating the current position of the multi-axis robot 10 from the multi-axis robot 10. For example, the feedback information acquisition module 133 acquires information indicating the angles of the joint axes J1 to J6 from the actuators 11 to 16.

In step S34, the predicted position information generation module 132 derives the predicted position information based on the current position of the multi-axis robot 10, the model information of the multi-axis robot 10, and the first operation command, and outputs the predicted position information to the third controller 300 via the communication module 110. For example, the predicted position information generation module 132 performs kinematics calculation and dynamics calculation using the angle target values of the joint axes J1 to J6 generated by the command conversion module 131, the angle information of the joint axes J1 to J6 acquired by the feedback information acquisition module 133, and the model information stored in the model storage module 120, thereby calculating the predicted position information (for example, numerical data indicating the predicted position and attitude of the tip portion of the multi-axis robot 10) at the time of transition to the next control cycle to output the information to the control processing module 130 via the communication module 110.

In step S35, the power output module 140 outputs driving power in accordance with the first operation command to the multi-axis robot 10. For example, the power output module 140 outputs the driving power for operating the joint axes J1 to J6 to the actuators 11 to 16 according to the angle target value generated by the command conversion module 131. More specifically, the power output module 140 outputs to the actuators 11 to 16 the driving power of a value acquired by executing proportional calculation, proportional integral calculation, proportional integral differential calculation, or the like with respect to a difference between the angle target value generated by the command conversion module 131 and the angle acquired by the feedback information acquisition module 133. Note that the first controller 100 may execute step S35 prior to step S34 or may execute step S35 in parallel with step S34.

In step S36, the command conversion module 131 checks the reception status of the command from the first communication module 320 to the communication module 110, and checks whether it has received a completion command of control of the multi-axis robot 10.

In response to determining in step S36 that the completion command has not been received, the process returns to step S32. Thereafter, acquisition of the first operation command, calculation/output of the predicted position information, and output of the driving power are repeated in the control cycle until the completion command is received.

In response to determining in step S36 that the completion command has been received, the control processing procedure is thus completed.

In accordance with one or more embodiments, the control system 1 includes the first controller 100 configured to control a first controlled object, the second controller 200 configured to control a second controlled object having higher responsiveness than the first controlled object, and a third controller 300 configured to operate the first controlled object via the first controller 100 and configured to operate the second controlled object via the second controller 200. The third controller 300 includes the first communication module 320 configured to input and output information to and from the first controller 100, the second communication module 330 configured to input and output information to and from the second controller 200, and the control processing module 340 configured to output a first operation command for operating the first controlled object to the first controller 100 via the first communication module 320, configured to output a second operation command for operating the second controlled object to the second controller 200 via the second communication module 330, configured to acquire information on a current position of the first controlled object from the first controller 100 via the first communication module 320, and configured to correct the second operation command based on information on the current position of the first controlled object.

In the control system 1 according to some embodiments, the second operation command is corrected according to the information on the current position of the first controlled object. This makes it possible to reduce the shift of the operation timings between the operation of the first controlled object and the operation of the second controlled object.

According to some embodiments, the information on the current position of the first controlled object may be the predicted position information on the first controlled object that is derived based on the current position of the first controlled object, the model information of the first controlled object, and the first operation command. In a case where the current position of the first controlled object is grasped and the operation of the second controlled object is adjusted to the current position, since the position of the first controlled object has already changed at the time when the second controlled object moves to the position corresponding to the current position, the operation timing of the second controlled object may be delayed. In contrast, use of the predicted position information of the first controlled object as information on the current position of the first controlled object can reduce the delay of the operation timing of the second controlled object.

According to some embodiments, the first controller 100 may include the communication module 110 configured to input and output information to and from the third controller 300, and the control processing module 130 configured to derive predicted position information based on the current position of the first controlled object, the model information of the first controlled object, and the first operation command, and configured to output the predicted position information to the third controller 300 via the communication module 110. Incorporating the function of deriving the predicted position information into the first controller 100 makes it possible to use the existing model information for controlling the first controlled object in order to derive the predicted position information. Thus, since it is not necessary to input the model information of the first controlled object only for the purpose of deriving the predicted position information, it is possible to improve the efficiency of information processing and usability.

According to some embodiments, the first controlled object may be the multi-axis robot 10 having a plurality of joint axes, and the second controlled object may be the peripheral device 20 operable in cooperation with the multi-axis robot 10. In facilities including multi-axis robots, differences in responsiveness tend to increase between the multi-axis robot and its peripheral devices. Therefore, there is a possibility that the shift of the operation timings between the multi-axis robot and the peripheral device cannot be sufficiently reduced merely by adjusting the operation command using the transfer function as shown in Japanese Unexamined Patent Publication No. H07-72911. In contrast, applying the configuration of the control system 1 in which the multi-axis robot 10 is the first controlled object and the peripheral device 20 is the second controlled object makes it possible to correct the second operation command according to information on the current position of the multi-axis robot 10. Thus, it is possible to sufficiently reduce the shift of the operation timings between the multi-axis robot 10 and the peripheral device 20.

According to some embodiments, the configuration in which the first controlled object is the multi-axis robot 10, and the second controlled object is the peripheral device 20 corresponds to a configuration in which there is the relation of master to servant between the machine controller (third controller 300) and the robot controller (first controller 100). In this case, since the high order arithmetic unit for executing cooperative control and the like can be exclusively disposed in the machine controller and the function of the robot controller can specialize in controlling the multi-axis robot 10, the robot controller can be simplified. In addition, since it is possible to control the robot controller via the machine controller, it is possible to solve some complications with respect to the separate use between the programming language for the machine controller and the programming language for the robot controller. Therefore, the embodiments of the present invention are also effective in simplifying the configuration of the control system as a whole and improving its usability.

Although the embodiments have been described above, the present invention is not necessarily limited to the above-described embodiments, and various modifications may be made without departing from the scope of the invention.

Indeed, the novel devices, systems and methods described herein may be embodied in a variety of other forms; furthermore, various omissions, substitutions and changes in the form of the devices, systems and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Regarding the above embodiments, the following appendices are appended.

[Appendix 1] A control system comprising:
a first controller configured to control a first controlled object;
a second controller configured to control a second controlled object having higher responsiveness than the first controlled object; and
a third controller configured to operate the first controlled object via the first controller and configured to operate the second controlled object via the second controller,
wherein the third controller includes:
a first communication module configured to input and output information to and from the first controller,
a second communication module configured to input and output information to and from the second controller, and
a control processing module configured to:
output a first operation command for operating the first controlled object to the first controller via the first communication module,
output a second operation command for operating the second controlled object to the second controller via the second communication module,
acquire information on a current position of the first controlled object from the first controller via the first communication module, and
correct the second operation command based on information on the current position of the first controlled object.

[Appendix 2] The control system according to appendix 1, wherein the information on the current position of the first controlled object is a predicted position information of the first controlled object derived based on the current position of the first controlled object, model information of the first controlled object, and the first operation command.

[Appendix 3] The control system according to appendix 2, wherein the first controller comprises a communication module configured to input and output information to and from the third controller, and a control processing module configured to derive the predicted position information based on the current position of the first controlled object, the model information of the first controlled object, and the first operation command, and output the predicted position information to the third controller via the communication module.

[Appendix 4] The control system according to any one of appendices 1 to 3, wherein the first controlled object is a multi-axis robot having a plurality of joint axes and the second controlled object is a peripheral device that is cooperatively operable with the multi axis robot.

[Appendix 5] A controller comprising:
a first communication module configured to input and output information to and from a first controller that controls a first controlled object;
a second communication module configured to input and output information to and from a second controller that controls a second controlled object having higher responsiveness than the first controlled object; and
a control processing module configured to:
output a first operation command for operating the first controlled object to the first controller via the first communication module,
output a second operation command for operating the second controlled object to the second controller via the second communication module,
acquire information on a current position of the first controlled object from the first controller via the first communication module, and
correct the second operation command based on information on the current position of the first controlled object.

[Appendix 6] The controller according to appendix 5, wherein the information on the current position of the first controlled object is predicted position information on the first controlled object that is derived based on the current position of the first controlled object, a model of the first controlled object, and the first operation command.

[Appendix 7] The controller according to appendix 5 or 6, wherein the first controlled object is a multi-axis robot having a plurality of joint axes and the second controlled object is a peripheral device that is cooperatively operable with the multi-axis robot.

[Appendix 8] A controller comprising:
a power output module configured to output driving power in accordance with a first operation command to a first controlled object;
a communication module configured to input and output information to and from another controller; and
a control processing module configured to derive predicted position information on the first controlled object based on a current position of the first controlled object, a model of the first controlled object, and the first operation command, and configured to output a predicted position information to the other controller via the communication module.

[Appendix 9] A control method performed by a third controller configured to operate a first controlled object via a first controller configured to control the first controlled object, and configured to operate a second controlled object via a second controller configured to control the second controlled object having higher responsiveness than the first controlled object, the control method comprising:
outputting a first operation command for operating the first controlled object to the first controller;
outputting a second operation command for operating the second controlled object to the second controller;
acquiring information on a current position of the first controlled object from the first controller; and
correcting the second operation command based on information on the current position of the first controlled object.

[Appendix 10] The control method according to appendix 9, wherein the information on the current position of the first controlled object is predicted position information on the first controlled object that is derived based on the current position of the first controlled object, a model of the first controlled object, and the first operation command.

[Appendix 11] The control method according to claim 10, further comprising deriving the predicted position information based on the current position of the first controlled object, the model of the first controlled object, and the first operation command by the first controller.

[Appendix 12] The control method according to any one of claims 9 to 11, wherein the first controlled object is a multi-axis robot having a plurality of joint axes and the second controlled object is a peripheral device that operates in cooperation with the multi-axis robot.

What is claimed is:
1. A controller comprising:
a first communication device configured to input and output information to and from a first controller that controls a first controlled object associated with a first response delay;
a second communication device configured to input and output information to and from a second controller that controls a second controlled object, wherein the second controlled object is configured to perform a collaborative operation with the first controlled object, and is associated with a second response delay, and wherein there is a difference between the first response delay and the second response delay; and
a processing device configured to:
output a first operation command to the first controller via the first communication device in order to operate the first controlled object,
output a second operation command to the second controller via the second communication device in order to operate the second controlled object,
acquire current position information of the first controlled object via the first communication device, wherein the current position information is based on a current position of the first controlled object that is sensed during the collaborative operation, and
modify the second operation command based on the current position information of the first controlled object and based on the difference between the first response delay and the second response delay, in order to calibrate the collaborative operation of the second controlled object,
wherein the first response delay is larger than the second response delay, and wherein modifying the second operation command operates to reduce a timing offset resulting from the difference between the first response delay and the second response delay.

2. The controller according to claim 1, wherein the processing device is configured to repeat a number of control cycles, each one of the control cycles comprising:
  outputting the first operation command to the first controller,
  outputting the second operation command to the second controller,
  acquiring the current position information of the first controlled object from the first controller, and
  modifying the second operation command based, at least in part, on the current position of the first controlled object that is sensed during the collaborative operation.

3. The controller according to claim 2, wherein the current position information of the first controlled object acquired by the processing device at a given one of the control cycles, corresponds to a predicted positioning of the first controlled object at a time of transition to a next one of the control cycles.

4. The controller according to claim 2, wherein the processing device is configured to generate the first operation command and the second operation command at each of the control cycles based on motion information indicating a sequential operation of the first operation command and the second operation command.

5. The controller according to claim 4, wherein the motion information comprises first values associated with the first operation command, and second values associated with the second operation command, wherein each of the first values is correlated with one of the second values, and wherein the processing device is configured to modify the second operation command by:
  selecting one of the first values, as a selected first value, based on the current position information of the first controlled object,
  selecting one of the second values that is correlated with the selected first value, as a selected second value, and
  setting the second operation command to the selected second value.

6. The controller according to claim 1, wherein the first controlled object comprises a multi-axis robot having a plurality of joint axes and the second controlled object comprises a peripheral device that is cooperatively operable with the multi-axis robot.

7. The controller according to claim 6, wherein the peripheral device has a number of motion axes, and the number of the motion axes is smaller than a number of the joint axes of the multi-axis robot.

8. The controller according to claim 6, wherein the multi-axis robot has a tip portion, and
  wherein the first operation command comprises numerical data defining a positional target value of the tip portion.

9. The controller according to claim 6, wherein the peripheral device has one or more motion axes, and the second operation command comprises numerical data defining an operation target value of an actuator of the motion axes.

10. A control system comprising:
  the controller according to claim 1 as a third controller;
  the first controller; and
  the second controller.

11. The control system according to claim 10, wherein the first controller is configured to;
  communicate with the third controller;
  derive predicted positioning associated with the first controlled object based on the current position of the first controlled object, on model information indicating at least a mechanical parameter of the first controlled object, and on the first operation command; and
  output the predicted positioning to the third controller, as the current position information of the first controlled object.

12. The control system according to claim 11, wherein the first controlled object comprises a multi-axis robot having a tip portion and a plurality of joint axes,
  wherein the first operation command comprises numerical data defining a positional target value of the tip portion, and
  wherein the first controller is configured to:
  acquire angles of the joint axes as a current position, and
  calculate the predicted positioning by performing dynamic calculation using a target value of the angles of the joint axes, the current position, and the model information.

13. The control system according to claim 12, wherein the processing device of the third controller is configured to repeat a number of control cycles, each one of the control cycles comprising:
  outputting the first operation command to the first controller;
  outputting the second operation command to the second controller;
  acquiring the current position information of the first controlled object based on the current position of the first controlled object that is sensed by the first controller; and
  modifying the second operation command,
  wherein the first controller is configured to calculate the predicted positioning of the first controlled object at a time of transition to a next one of the control cycles.

14. A controller comprising:
  a first communication device configured to input and output information to and from a first controller that controls a first controlled object associated with a first response delay;
  a second communication device configured to input and output information to and from a second controller that controls a second controlled object, wherein the second controlled object is configured to perform a collaborative operation with the first controlled object, and is associated with a second response delay, and wherein there is a difference between the first response delay and the second response delay; and
  a processing device configured to:
  output a first operation command to the first controller via the first communication device in order to operate the first controlled object,
  output a second operation command to the second controller via the second communication device in order to operate the second controlled object,
  acquire current position information of the first controlled object via the first communication device, wherein the current position information is based on a current position of the first controlled object that is sensed during the collaborative operation, and
  modify the second operation command based on the current position information of the first controlled object and based on the difference between the first response delay and the second response delay, in order to calibrate the collaborative operation of the second controlled object,
  wherein the current position information of the first controlled object comprises a predicted positioning of the first controlled object based on the current position sensed during the collaborative operation, wherein the predicted positioning accounts for a delay between sensing the current position of the first controlled object and operating the second controlled object in response to the second operation command.

15. A controller comprising:
a first communication device configured to input and output information to and from a first controller that controls a first controlled object associated with a first response delay;
a second communication device configured to input and output information to and from a second controller that controls a second controlled object, wherein the second controlled object is configured to perform a collaborative operation with the first controlled object, and is associated with a second response delay, and wherein there is a difference between the first response delay and the second response delay; and
a processing device configured to repeat a number of control cycles, each one of the control cycles comprising:
outputting a first operation command to the first controller via the first communication device in order to operate the first controlled object,
outputting a second operation command to the second controller via the second communication device in order to operate the second controlled object,
acquiring current position information of the first controlled object from the first controller via the first communication device, wherein the current position information is based on a current position of the first controlled object that is sensed during the collaborative operation, and
modifying the second operation command based on the current position information of the first controlled object and based on the difference between the first response delay and the second response delay, in order to calibrate the collaborative operation of the second controlled object,
wherein the processing device is configured to generate the first operation command and the second operation command at each of the control cycles based on motion information indicating a sequential operation of the first operation command and the second operation command,
wherein the motion information comprises first values associated with the first operation command, and second values associated with the second operation command, wherein each of the first values is correlated with one of the second values, and wherein the processing device is configured to modify the second operation command by:
selecting one of the first values, as a selected first value, based on the current position information of the first controlled object,
selecting one of the second values that is correlated with the selected first value, as a selected second value, and
setting the second operation command to the selected second value, and
wherein the first values in the motion information comprise first positioning values, and the second values in the motion information comprise second positioning values,
the current position information of the first controlled object comprises a predicted positioning of the first controlled object, the selected first value is selected among the first positioning values in the motion information by closest match with the predicted positioning, and
the second operation command is set in order to operate the second controlled object to achieve a positioning of the selected second value.

16. A control method comprising:
outputting a first operation command to a first controller configured to operate a first controlled object associated with a first response delay;
outputting a second operation command to a second controller configured to operate a second controlled object, wherein the second controlled object is configured to perform a collaborative operation with the first controlled object, and is associated with a second response delay, and wherein there is a difference between the first response delay and the second response delay;
acquiring current position information of the first controlled object from the first controller, wherein the current position information is based on a current position of the first controlled object that is sensed during the collaborative operation; and
modifying the second operation command based on the current position information of the first controlled object, in order to calibrate the collaborative operation of the second controlled object,
wherein the first response delay is larger than the second response delay, and wherein modifying the second operation command operates to reduce a timing offset resulting from the difference between the first response delay and the second response delay.

17. A controller comprising:
a first communication device configured to input and output information to and from a first controller that controls a first controlled object associated with a first response delay;
a second communication device configured to input and output information to and from a second controller that controls a second controlled object, wherein the second controlled object is configured to perform a collaborative operation with the first controlled object, and is associated with a second response delay that is smaller than the first response delay; and
a processing device configured to:
output a first operation command to the first controller via the first communication device in order to operate the first controlled object,
output a second operation command to the second controller via the second communication device in order to operate the second controlled object,
acquire current position information of the first controlled object via the first communication device, wherein the current position information is based on a current position of the first controlled object that is sensed during the collaborative operation, and
modify the second operation command based on the current position information of the first controlled object, in order to calibrate the collaborative operation of the second controlled object.

18. The controller according to claim 17, wherein the second operation command is modified to reduce a timing offset resulting from a difference between the first response delay and the second response delay.

* * * * *